T. H. TOWELL.
HORN FOR TALKING MACHINES.
APPLICATION FILED JULY 29, 1910.

1,024,108.

Patented Apr. 23, 1912.
3 SHEETS—SHEET 1.

WITNESSES:
Anna L. Gill
Jno. T. Oberlin

INVENTOR
Thomas H. Towell
BY J. B. Fay
ATTORNEY

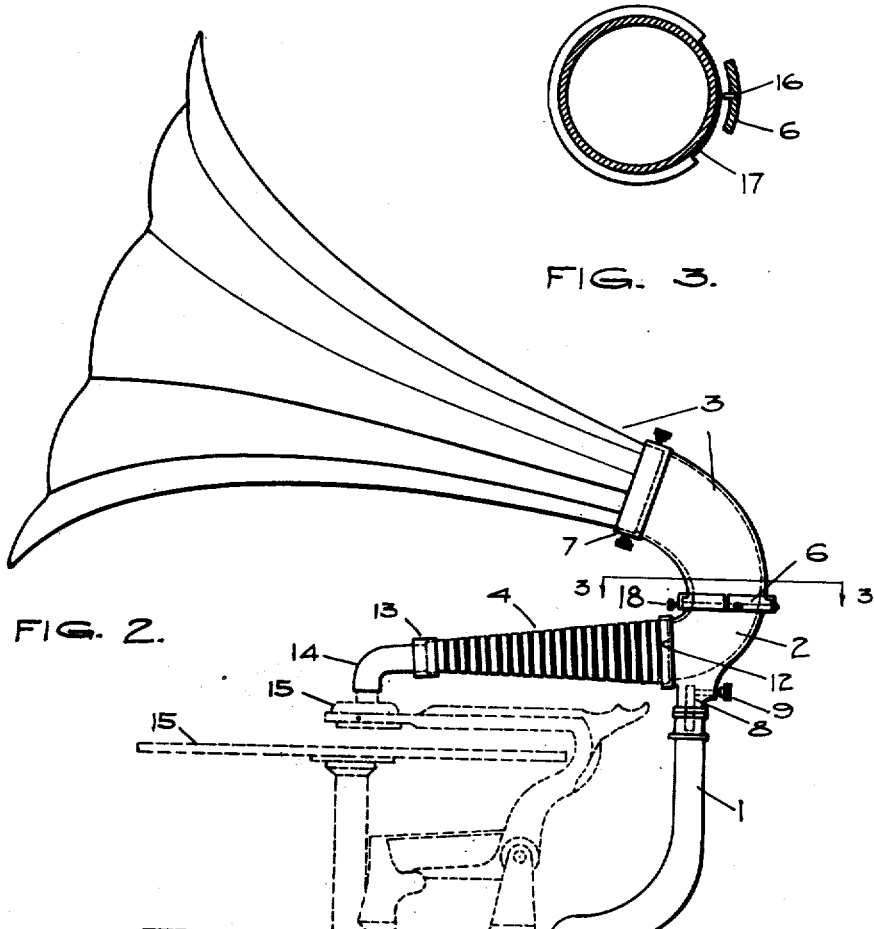

T. H. TOWELL.
HORN FOR TALKING MACHINES.
APPLICATION FILED JULY 29, 1910.

1,024,108.

Patented Apr. 23, 1912.

3 SHEETS—SHEET 3.

WITNESSES:
Anna L. Gill
Jno. F. Oberlin

INVENTOR
Thomas H. Towell
BY J. B. Fay
ATTORNEY

UNITED STATES PATENT OFFICE.

THOMAS H. TOWELL, OF CLEVELAND, OHIO, ASSIGNOR TO THE UNITED STATES PHONOGRAPH COMPANY, OF CLEVELAND, OHIO, A CORPORATION OF OHIO.

HORN FOR TALKING-MACHINES.

1,024,108.  Specification of Letters Patent.  Patented Apr. 23, 1912.

Application filed July 29, 1910. Serial No. 574,467.

*To all whom it may concern:*

Be it known that I, THOMAS H. TOWELL, a citizen of the United States, and a resident of Cleveland, county of Cuyahoga, and State of Ohio, have invented a new and useful Improvement in Horns for Talking-Machines, of which the following is a specification, the principle of the invention being herein explained and the best mode in which I have contemplated applying that principle, so as to distinguish it from other inventions.

The present invention, relating as indicated to horns for talking machines, has as its object the provision of a horn suitable for use on such machines whether of the disk or cylinder type, and one that will be readily adjustable to the various requirements encountered in operating either such type of machine.

To the accomplishment of these and related ends, said invention, then, consists of the means hereinafter fully described and particularly pointed out in the claims, it being noted that claims specifically drawn to the improved sound amplifier as such are presented in a separate divisional application, filed March 18, 1912, Serial No. 684,443.

The annexed drawings and the following description set forth in detail certain mechanism embodying the invention, such disclosed means constituting, however, but one of various mechanical forms in which the principle of the invention may be used.

Figure 1:
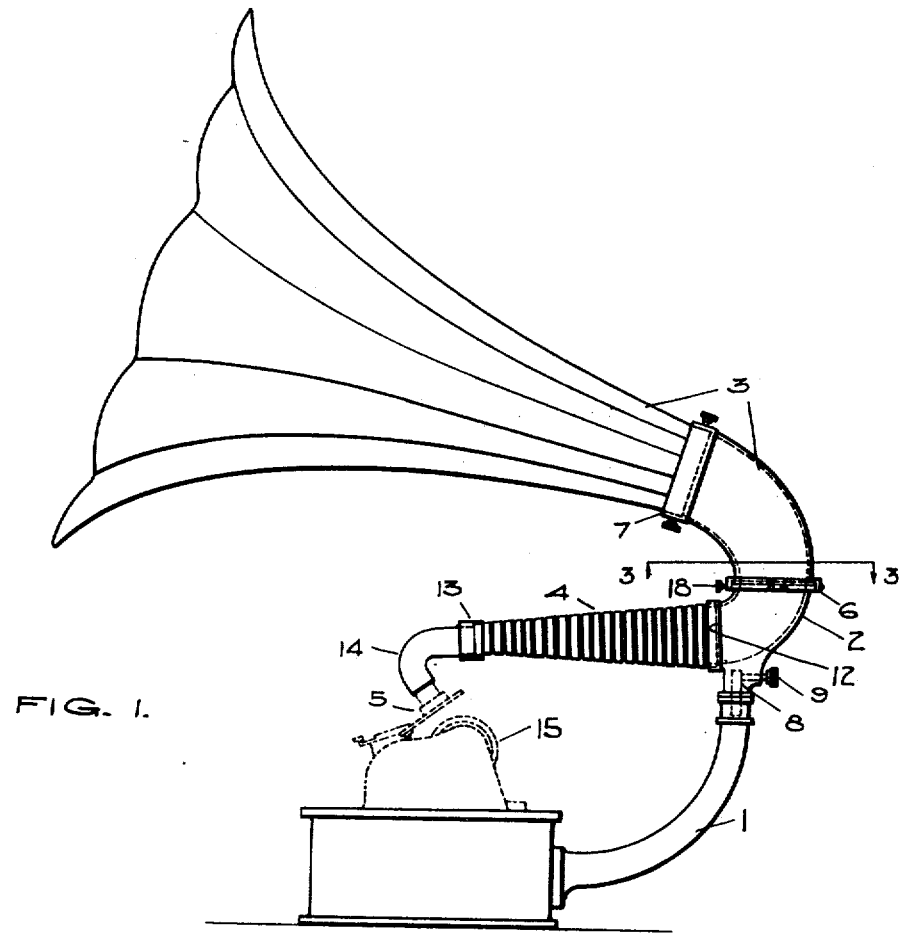
Figure 5:
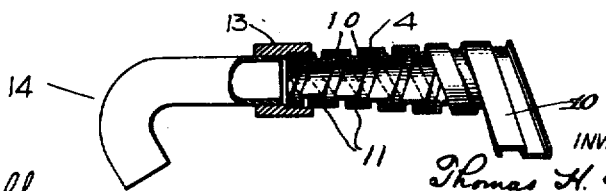
Figure 6:
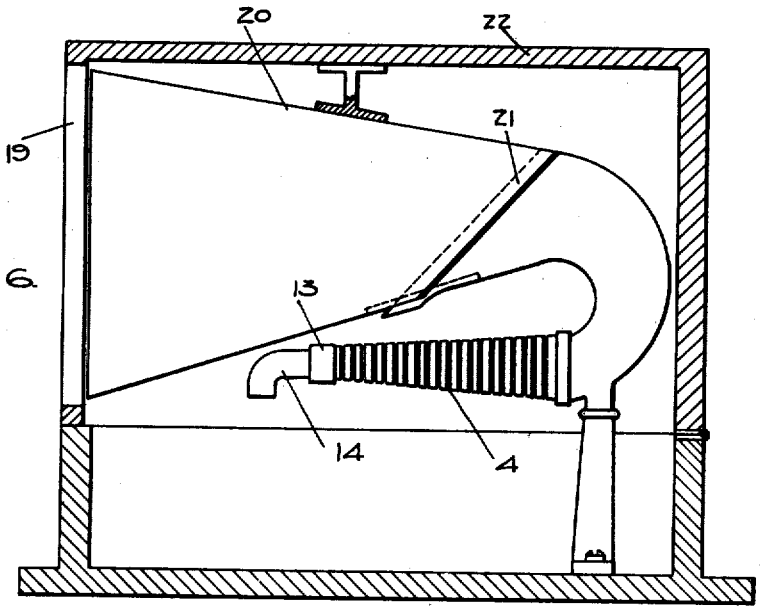
Figure 7:
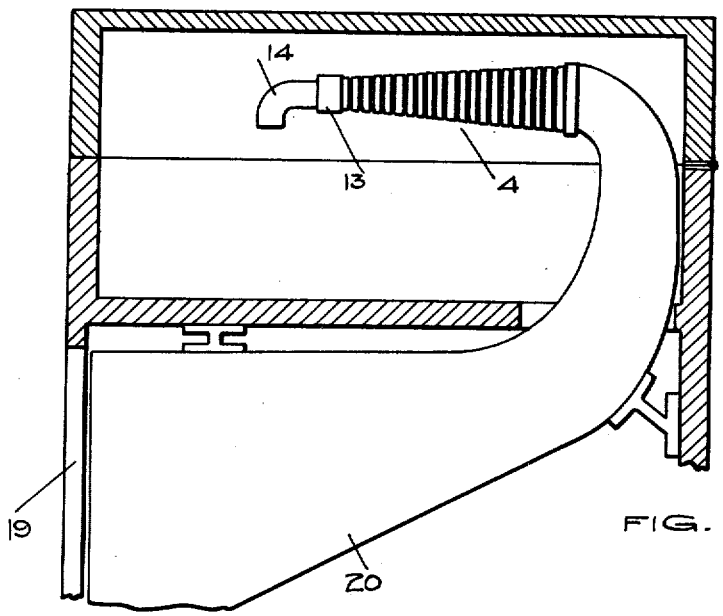

In said annexed drawings:—Figure 1 is a side elevation of one typical form of cylinder talking machine with a horn shown in connection therewith embodying the present improvements; Fig. 2 is a side elevation similar to that of Fig. 1 but showing the horn as applied to a talking machine of the disk type; Fig. 3 is a horizontal sectional detail of such horn; Fig. 4 is a vertical section of a detail of the jointed elbow connecting the tone arm with the amplifier proper; Fig. 5 is similarly a vertical section of the forward end of said tone arm, the pitch of the coiled interlocking strip composing such tone arm being exaggerated in order to render the construction of the latter clear; and Figs. 6 and 7 show the adaptation of the horn to two types of cabinets.

Referring first of all to the form of the horn illustrated in Fig. 1, it will be noted that such horn is there shown as applied to a talking machine of the cylinder type. Only the outline of such machine, however, is shown together with the case or cabinet upon which it is mounted. The horn is designed to be supported upon a bracket 1 extending rearwardly and upwardly from said cabinet and comprises in effect three portions, a tubular elbow 2 pivotally mounted upon the bracket in question about a vertical axis, an amplifying horn 3 proper, and an extension 4 forming the sound-conveying connection between the small end of the latter and the sound-box 5 of the talking machine. The openings of such tubular elbow are substantially right angularly related and it is with the upwardly directed one that the amplifying horn is connected, being pivotally secured to the elbow by a sectional flange 6, as clearly shown in Fig. 4, one section of such flange being detachably secured in place by a set-screw 18, whereby the horn may be entirely removed from the elbow. Said horn is furthermore constructed in one or more sections, which may be separated, as at the joint 7, if desired to facilitate packing in case of shipment or storage, the horn being more or less in the way when not in use.

Pivotal movement of horn 3 upon the bracket is limited in either direction by a stop 16 carried by the other section of such flange and coöperating with a segmental notch or recess 17 in the edge of the horn, as will be readily understood. The elbow 2 is thus pivotally mounted about an upwardly directed pin or stud 8 on the bracket 1, and is designed to be normally fixedly secured, or in other words, held against rotation, by means of a set screw 9, that co-operates with such pin. It is not designed that such elbow shall have any movement about this pin in the normal use of the horn, such pivoting being merely provided in order to enable the horn to be swung to one side, in case it becomes desirable to entirely disconnect the same from the sound-box.

The sound conveyer 4 extending from the small end of the horn 3, or rather, from the horizontally directed opening of the elbow 2, to the sound-box comprises a section of flexible metallic tubing, a preferred constructional form of such tubing being that shown in the sectional view of Fig. 5, from which it will be seen to consist of coiled interlocking strips 10 of metal, with an interposed packing strip 11. Such sound-conveyer is furthermore made tapering to conform with the taper of the amplifying horn and elbow so that, in other words, there is a continuous and general increase in the diameter of the bore of the passage formed by such extension, elbow and the amplifier, proper.

The larger end of the conveyer is received in an annular socket or recess 12 formed in the casting constituting the elbow, while a ferrule or sleeve 13 is similarly fitted over the smaller end of such conveyer, one end of the short recurved tube, or elbow 14, that connects the sound conveyer with the sound box being designed to slidably fit within such sleeve, just as the other end of such tube 14, fits slidably over the upwardly extending tubular portion of the sound-box 5.

The flexible character of the sound conveyer permits the sound-box to travel across the record upon the record support 15 with perfect freedom, while still preserving a direct connection with the amplifier. The bore, moreover, of such conveyer, increases gradually in diameter in accordance with the well known principle of acoustics, so that the sounds emanating from the sound-box are reproduced in perfect tone and undiminished volume. The horn proper may obviously be swung so as to extend in any desired direction without interfering in the slightest with the flexing of the sound conveyer although the stop 16 prevents any turning of the horn to an extent that might overbalance the machine. When it is desired to remove the horn this is readily accomplished by releasing the set-screw 18 that holds the detachable section of the retaining flange in place. Should it, furthermore, become necessary or desirable to entirely disconnect the sound conveyer from the sound-box in order to get at the machine, this may be accomplished by simply loosening set screw 9, when the elbow, together with the sound conveyer and amplifier attached thereto, may be swung to one side.

Practically no modification is required in the construction hereinbefore described in order to adapt the same for use with a talking machine of the disk type instead of the cylinder type. Thus in Fig. 2 it will be seen that by slightly modifying the form of the bracket 1 whereby the tubular elbow 2 is supported the horn may be bodily transferred to such disk type.

What has just been said concerning the disk type machine applies equally to the use of my improved construction of horn in talking machine cabinets of the several kinds familiar to the trade. Thus in Fig. 6, the adaptation of such horn is shown to a cabinet wherein the discharge opening 19 is located above the machine. The horn or amplifier 20 proper here does not require to be pivotally secured to the elbow so that the flange connection 6 may be omitted. The horn, however, is made separable as at 21 on an inclined plane so as to permit that portion of the horn which is fixedly attached to the cover 22 to be raised when the latter is tilted upwardly. The construction of the flexible sound box with the elbow is, however, the same as before. In Fig. 7 the discharge opening is shown as being located below the talking machine compartment of the cabinet, thus requiring the horn to be curved downwardly instead of upwardly. As it does not in this form of construction require to be separated at all, the connection between the elbow and the horn or amplifier proper may be made a fixed one, or the two parts in question may be in effect constructed integrally.

Other modes of applying the principle of my invention may be employed instead of the one explained, change being made as regards the mechanism herein disclosed, provided the means stated by any of the following claims or the equivalent of such stated means to be employed.

I therefore particularly point out and distinctly claim as my invention:—

1. In a talking machine, the combination of a record support, a generally tapering amplifying horn proper mounted at its smaller end adjacent to said support, a flexible tubular extension to such smaller end consisting of coiled interlocking strips, such extension being tapered to conform with the taper of said amplifying horn and projecting over said record support, and a sound-box connected with the outer end of such extension.

2. In a talking machine, the combination of a record support, a curved amplifying horn proper of generally tapering form pivotally mounted at its smaller end adjacent to said support, a flexible tubular extension to such smaller end consisting of coiled interlocking strips of metal, such extension being tapered to conform with the taper of said amplifying horn and projecting over said record support, and a sound-box connected with the outer end of said extension.

3. In a talking machine, the combination of a record support; a tubular elbow with substantially right angularly related openings mounted adjacent to said support with one such opening directed upwardly; a generally tapering amplifying horn proper connected with such upwardly directed opening; a flexible sound conveyer consisting of interlocking strips connected with the other opening in said elbow, said conveyer being tapered to conform with the taper of said amplifying horn and projecting over said record support; and a sound-box connected with the outer end of said conveyer.

4. In a talking machine, the combination of a record support; a tubular elbow with substantially right angularly related openings mounted adjacent to said support with one such opening directed upwardly; a generally tapering amplifying horn proper connected with such upwardly directed opening; a flexible sound conveyer consisting of coiled interlocking strips of metal connected with the other opening in said elbow, said conveyer being tapered to conform with the taper of said amplifying horn and projecting over said record support; and a sound-box connected with the outer end of said conveyer.

5. In a talking machine, the combination of a record support; a tubular elbow with substantially right angularly related openings mounted adjacent to said support with one such opening directed upwardly; a generally tapering amplifying horn proper pivotally mounted upon said elbow and connected with such upwardly directed opening; a flexible sound conveyer consisting of coiled interlocking strips connected with the other opening in said elbow, said conveyer being tapered to conform with the taper of said amplifying horn and projecting over said record support; and a sound-box connected with the outer end of said conveyer.

6. In a talking machine, the combination of a record support; a tubular elbow, with substantially right angularly related openings, pivotal about a vertical axis adjacent to said support, said elbow having one such opening directed upwardly; a generally tapering amplifying horn properly connected with such upwardly directed opening; a flexible sound conveyer consisting of coiled interlocking strips connected with the other opening in said elbow, said conveyer being tapered to conform with the taper of said amplifying horn and projecting over said record support; and a sound-box connected with the other end of said conveyer.

7. In a talking machine, the combination of a record support; a tubular elbow, with substantially right angularly related openings, pivotal about a vertical axis adjacent to said support, said elbow having one such opening directed upwardly; a generally tapering amplifying horn proper pivotally mounted upon said elbow and connected with such upwardly directed opening; a flexible sound conveyer consisting of coiled interlocking strips of metal connected with the other opening in said elbow, said conveyer being tapered to conform with the taper of said amplifying horn and projecting over said record support; and a sound box connected with the other end of said conveyer.

8. In a talking machine, the combination of a record support; a tubular elbow, with substantially right angularly related openings, pivotal about a vertical axis adjacent to said support, said elbow having one such opening directed upwardly; means adapted to secure said elbow in desired angular position about its axis; a generally tapering amplifying horn proper, connected with such upwardly directed opening; a flexible sound conveyer consisting of coiled interlocking strips connected with the other opening in said elbow, said conveyer being tapered to conform with the taper of said amplifying horn and projecting over sound record support; and a sound box connected with the other end of said conveyer.

9. In a talking machine, the combination of a record support; a tubular elbow, with substantially right angularly related openings, pivotal about a vertical axis adjacent to said support, said elbow having one such opening directed upwardly; a generally tapering amplifying horn proper, detachably pivotally mounted upon said elbow and connected with such upwardly directed opening; a flexible sound conveyer consisting of coiled interlocking strips of metal connected with the other opening in said elbow, said conveyer being tapered to conform with the taper of said amplifying horn and projecting over said record support; and a sound box connected with the other end of said conveyer.

10. In a talking machine, the combination of a record support; a bracket adjacent thereto; a tubular elbow, with substantially right angularly related openings, mounted upon said bracket so as to be pivotal about a vertical axis, said elbow having one such opening directed upwardly; means adapted to secure said elbow in desired angular position about its axis; a generally tapering amplifying horn proper detachably pivotally mounted upon said elbow and connected with such upwardly directed opening; a flexible sound conveyer consisting of coiled interlocking strips of metal connected with the other opening in said elbow, said conveyer being tapered to conform with the taper of said amplifying horn and projecting over said record support; and a sound box connected with the other end of said conveyer.

11. In a talking machine, the combination of a record support; a bracket adjacent thereto; a tubular elbow, with substantially right angularly related openings, mounted upon said bracket so as to be pivotal about a vertical axis, said elbow having one such opening directed upwardly; means adapted to secure said elbow in desired angular position about its axis; a generally tapering amplifying horn connected with such upwardly directed opening; a sectional flange pivotally securing said horn to said elbow, one of the sections of said flange being detachable, whereupon said horn may be removed; a flexible sound conveyer consisting of coiled interlocking strips of metal connected with the other opening in said elbow, said conveyer being tapered to conform with the taper of said amplifying horn and projecting over said record support; and a sound box connected with the other end of said conveyer.

Signed by me this 25th day of July, 1910.

THOMAS H. TOWELL.

Attested by—
D. T. DAVIES,
JNO. F. OBERLIN.